(12) United States Patent
Han et al.

(10) Patent No.: US 7,079,579 B2
(45) Date of Patent: Jul. 18, 2006

(54) BLOCK MATCHING PROCESSOR AND METHOD FOR BLOCK MATCHING MOTION ESTIMATION IN VIDEO COMPRESSION

(75) Inventors: Tae-Hee Han, Kyonggi-do (KR); Seung Ho Hwang, Taejon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 962 days.

(21) Appl. No.: 09/905,096

(22) Filed: Jul. 13, 2001

(65) Prior Publication Data

US 2002/0039386 A1   Apr. 4, 2002

Related U.S. Application Data

(60) Provisional application No. 60/218,266, filed on Jul. 13, 2000.

(51) Int. Cl.
*H04N 7/18* (2006.01)

(52) U.S. Cl. .................. 375/240.16; 375/240.17; 348/721

(58) Field of Classification Search ........... 375/240.11–240.17; 348/715–723
See application file for complete search history.

(56) References Cited

U.S. PATENT DOCUMENTS

| 5,604,546 A | * | 2/1997 | Iwata ...................... 348/699 |
| 5,696,836 A | * | 12/1997 | Yoshino et al. ............. 382/107 |
| 6,414,994 B1 | * | 7/2002 | Hazra .................... 375/240.16 |
| 6,519,005 B1 | * | 2/2003 | Bakhmutsky et al. .... 348/415.1 |

* cited by examiner

*Primary Examiner*—Andy Rao
(74) *Attorney, Agent, or Firm*—Cha & Reiter, L.L.C.

(57) ABSTRACT

There is provided a block matching processor and method for flexibly supporting block matching motion estimation at motion vector prediction modes using matching blocks of various sizes. Each of difference unit (D-unit) arrays takes each smallest size matching block, calculates the difference between the pixels of a current frame and the pixels of a reference frame, and converts the differences to absolute values. An accumulator generates SADs (Sum of Absolute Difference) for the smallest size matching blocks and SADs for all the matching blocks of various sizes by tree-like hierarchical addition of the absolute values of the smallest size matching blocks received from the D-unit arrays.

25 Claims, 16 Drawing Sheets

BLOCK MATCHING PROCESSOR AND METHOD FOR BLOCK MATCHING MOTION ESTIMATION IN VIDEO COMPRESSION

This application is based on and claims priority from U.S. provisional application No. 60/218,266 filed Jul. 13, 2000, the contents of which are hereby incorporated by reference.

BACKGROUND OF THE INVENTION

1. Field of the Invention

The present invention relates generally to video compression, and in particular, to a block matching processor for block matching motion estimation.

2. Description of the Related Art

Motion estimation which exploits temporal redundancies of an image sequence is a crucial step in video compression. Among diverse motion estimation techniques, a block matching algorithm (BMA) has been adopted in today's popular video coding standards due to computational simplicity with favorable performance. For details of the BMA, refer to D. Gall: 'MPEG: A video compression standard for multimedia algorithm', *Comm. ACM*, 1991, 4, pp. 47–58 [reference 1], P. Pirsch, N. Demassieux and W. Gehrke: 'VLSI architectures for video compression', *Proceedings of the IEEE.*, 1995, 2, pp. 220–246 [reference 2], and V. Bhaskaran and K. Konstantinides: 'Image and Video Compression Standards: Algorithms and Architectures' (Kluwer academic publishers, 1990) 1st edn. [reference 3]. However, the enormous amount of computational requirement of the block matching has been a bottleneck in realizing a compact video encoding system. Hence reducing the amount of motion estimation hardware is the primary issue in designing a cost-effective single chip video encoder.

Regarding the prediction performance, the BMA has a few drawbacks which are mainly caused by employing a fixed block size. A stationary assumption within a block and a simplified translational motion model often violate real situation in image sequences. These problems could be relieved by using a variable size block matching algorithm (VSBMA). For details of the VSBMA, see M. H. Chan, Y. B. Yu and A. G. Constaninides: 'Variable size block matching motion compensation with applications to video coding', *IEE Proc.*, 1990, 8, pp. 205–212 [reference 4] and F. Defaux and F. Moscheni: 'Motion estimation techniques for digital TV: A review and a new contribution', *Proceedings of the IEEE*, 1995, 6, pp. 858–876 [reference 5].

In the VSBMA, the choice of the block size has long been shown to be a compromise between several factors. The use of smaller blocks results in higher adaptivity, but the correlation among blocks cannot be exploited, and thus limits the compression ratio achieved. The user of larger blocks can better exploit the picture correlation as a whole, but the stationary assumption within each block may then be distributed, and the quality as a result suffers. To produce the best result, arbitrary size of block should be used in motion vector predictions according to the rate-distortion function for video sources. However, considering all the facts of performance, computational efficiency and additional bits for block size information, a small number of block sizes are acceptable in practicable video coding systems.

In addition, while the earlier video coding standards such as H.261 and MPEG-1 allow a single mode for the motion vector prediction with a 16×16 macroblock, today's prevalent MPEG-2 which is adopted in worldwide digital TV has more functional choices. For this, see ISO/IEC JTC1/SC29/WG11 and ITV-TS SG 15 EG for ATM video coding: 'MPEG-2 test model 5', April 1993 [reference 6]. According to this document, field prediction mode and special prediction modes are appended besides frame prediction mode. In field pictures, a 16×16 macroblock is decomposed into two 16×8 blocks, where one corresponds to the odd field and the other to the even field. Special prediction modes refer to 16× motion-compensation and dual-prime mode are also concerned on a 16×8 block. Furthermore, in the advanced prediction mode of H.263 and MPEG-4, it is allowed to utilize the motion vectors for 8×8 blocks. See ISO/IEC-JTC1/SC29/WG11 N1908: 'Coding of moving pictures and audio', October 1997 [reference 7] and ITU-T Recommendation H.263: 'Video coding for low bit rate communication', December 1995 [reference 8]. Previous efforts on a block matching processor have mainly focused on the architecture of fixed block size and single prediction mode. For details, see [reference 2], L. De Vos and M. Stegherr: 'Parameterizable VLSI architectures for the full-search block-matching algorithms', IEEE Trans. on Circuits Syst., 1989, 10, pp. 1309–1306 [reference 9], and S. Chang, J.-H. Hwang and C.-W Jen: 'Scalable array architecture design for full search block matching', IEEE Trans. on CAS for Video Tech., 1995, 10, pp. 332–343 [reference 10]], D. M. Yang, M. T. Sun and L. Wu: 'A family of VLSI designs for the motion compensation block-matching algorithm', IEEE Trans. on Circuits syst., 1989, 10, pp. 1317–1325 [reference 11], and Y. Jehng and L. Chen and T. Chiueh: 'An efficient and simple VLSI tree architecture motion estimation algorithms', IEEE Trans. on Signal Processing, 1993, 4, pp. 148–157 [reference 12].

A block matching procedure and a hardware mapping for it on a conventional architecture will be described below. An overall computation flow in block matching with full-search can be expressed as

```
SAD_min = MAXVALUE
Vmin = (0,0);
for m = -K to K-1
    for n = -L to L-1
        SAD(m, n) - 0;
        for i = 0 to M-1
            for j = 0 to M-1
                SAD(m, n) = SAD(m, n) +|x(i, j)-y(i+m, j+n)|;
            endfor
        endfor
        if SAD < SAD_min then
            SAD_min =SAD(m, n);
            V_min = (m, n);
        endif
    endfor
endfor
```

The widely accepted criterion of block distortion measure is Sum of Absolute Difference (SAD). The operations involved for computing SAD(m, n) and $SAD_{min}$ are associative, and thus the order for exploring the index spaces (I, j) and (m, n) is arbitrary. The block matching computation is massively repetitive and thus suited to be realized in a systolic array processor. See [reference 2], [reference 10] to [reference 12], and S. Y. Kung: 'VLSI array processors' (Eaglewood Cliffs, N.J.: Prentice Hall, 1988) 1st edn. [reference 13]. Block matching operations with a systolic array can be expressed as follows. First, in the overall computation flow in block matching with full-search, i and j loops are paralleled and mapped onto hardware. All absolute difference values conforming to one distance measure are calculated concurrently in M×N PEs (Processing Elements).

The arrangement of the PE and the computation flow in the systolic array are illustrated in FIG. 1. FIG. 2 shows an example of conventional two-dimensional systolic array for block matching and the internal structure of the PE (see [reference 2] and [reference 5]). By the conventional architecture, we mean the typical two-dimensional systolic array architecture shown in [reference 2] and [reference 9], which has been the base architecture for a systolic array block matching processor. The PE computes differences between pixels in the current frame X and the previous frame Y and collectively accumulates them to produce the block distortion SAD(m, n) for each matched block whose displacement vector is (m, n). It is symbolically denoted as AD as shown in FIG. 2 and can be decomposed into two sub-PEs, i.e., A and D, as shown in FIGS. 3B and 3C, after operation shown in FIG. 3A. In FIG. 2, an operator M stands for a comparator shown in FIG. 3D and keeps the minimum block distortion.

FIG. 4 is a detailed block diagram of the PE. One PE 100 includes a difference part 102 with an inverter 108 and an adder 110, an absolute part 104 with an inverter 112 and an exclusive-OR gate 114, and an accumulation part 106 with an adder 116 and a register 118. The accumulation part 106 corresponds to an operator A shown in FIG. 3B, and the difference part 102 and the absolute part 104 correspond to an operator D shown in FIG. 3C. In FIG. 4, pixel data is 8 bits. Reference data representing the pixels of a reference frame and current data representing the pixels of a current frame correspond to X and Y, respectively in FIG. 3A and an intermediate result received from a previous PE corresponds to a in FIG. 3A.

As stated above, the PE AD in systolic mesh is decomposed into individual elements A and D, so that both of them can operate simultaneously to speed up the computation (see [reference 9] and [reference 12]).

To deal with various sizes of blocks at miscellaneous motion vector modes, however, additional special hardware is needed. Therefore, extra area and control overhead are imposed as constraints.

SUMMARY OF THE INVENTION

It is, therefore, an object of the present invention to provide a block matching processor which can flexibly deal with various sizes of matching blocks and miscellaneous motion vector prediction modes of the current video coding standards without extra area and control overhead.

The foregoing and other objects can be achieved by providing a block matching processor for flexibly supporting block matching motion estimation at motion vector prediction modes.

In the case where matching blocks has sizes being multiples of that of the smallest matching block, a plurality of D-unit arrays generate the absolute values of each smallest size matching block. Each D-unit array has D-units arranged corresponding to the pixels of each smallest size matching block, for calculating the difference between the pixels of a current frame and the pixels of a reference frame, and converting the differences to absolute values. An accumulator is connected to the D-unit arrays, for generating SADs for the smallest size matching blocks and SADs for all the matching blocks of various sizes by tree-like hierarchical addition of the absolute values of the smallest size matching blocks received from the D-unit arrays.

In the case where the size of matching blocks used is one of 8×8, 16×8 and 16×16 pixel sizes, a plurality of D-unit arrays generate the absolute values of 8×8 matching blocks. Each D-unit array has D-units arranged corresponding to the pixels of each 8×8 matching block, for calculating the difference between the pixels of a current frame and the pixels of a reference frame, and converting the differences to absolute values. An accumulator is connected to the D-unit arrays, for generating SADs (Sum of Absolute Difference) for the 8×8 matching blocks and SADs for a 16×8 matching block by tree-like hierarchical addition of the absolute values of the 8×8 matching blocks received from the D-unit arrays.

A method for flexibly supporting block matching motion estimation at motion vector prediction modes for a plurality of matching blocks of pixels having non-uniform sizes that are multiples of a smallest matching block of said plurality of matching blocks, comprises the steps of:

(a) generating an absolute value of each smallest size matching block in each D-unit array of a plurality of difference unit (D-unit) arrays, wherein said each D-unit array comprising a plurality D-units being arranged to correspond with an arrangement of pixels of said each smallest size matching block in each D-unit array;

(b) calculating differences between the pixels of a current frame and the pixels of a reference frame by each D-unit, and (c) converting the differences calculated in step (b) to absolute values; and (d) generating a SAD (Sum of Absolute Difference) for said each smallest size matching block and a SAD for all of the plurality of matching blocks of pixels having non-uniform sizes by hierarchically adding the absolute values of the smallest size matching blocks received from the D-unit arrays by an accumulator connected to the D-unit arrays for generating a SAD (Sum of Absolute Difference) for said each smallest size matching block, and (e) generating a SAD for all of the plurality of matching blocks of pixels having non-uniform sizes hierarchically adding the absolute values of the smallest size matching blocks received from the D-unit arrays.

In another aspect of the present invention, A method for flexibly supporting block matching motion estimation at motion vector prediction modes, where a size of matching blocks used is one of 8×8, 16×8 and 16×16 pixel sizes, said method comprising the steps of:

(a) generating absolute values of each 8×8 matching block for each D-unit array of a plurality of difference unit (D-unit) arrays having D-units arranged corresponding to the pixels of said each 8×8 matching block;

(b) calculating a difference between the pixels of a current frame and the pixels of a reference frame, (c) converting the differences calculated in step (b) to absolute values;

(d) generating a SAD (Sum of Absolute Difference) for said each 8×8 matching block and a SAD for a 16×8 matching block by hierarchically adding the absolute values of the 8×8 matching blocks generated in step (a) by the plurality of D-unit arrays from an accumulator connected to the D-unit arrays.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

The following description is made on a block matching processor according to the present invention which flexibly supports block matching motion estimation at motion vector prediction modes each using one size of matching block among 8×8, 16×8, and 16×16 pixel sizes with one hardware.

Figure 5:
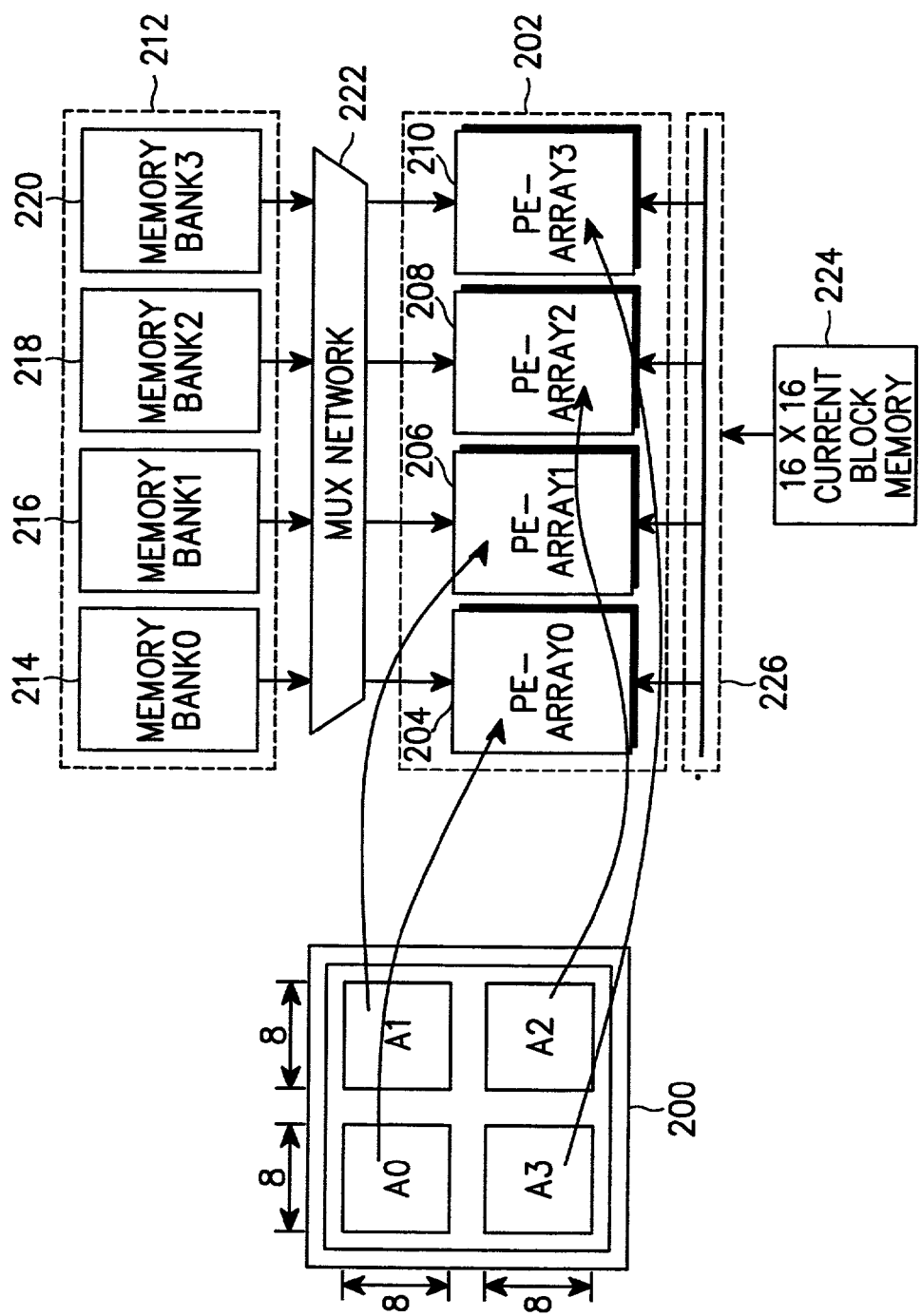
FIG. 5 illustrates a matching block organization and PE array mapping according to an embodiment of the present invention.

FIG. 5 illustrates a matching block organization and PE array mapping. Each pixel of the current block is associated with one of $N^2$ (N×N: block size) PEs. Once the current matching block data are loaded into PEs, they will be retained until the given search area is fully explored. A standard 16×16 macroblock 200 consists of two 16×8 blocks, and a 16×8 block can be decomposed into two 8×8 blocks. An 8×8 matching block is the smallest basic processing unit in the block matching processor of the present invention and the 8×8 matching blocks are mapped on PE arrays 204 to 210 of a PE array module 202 in FIG. 5. The 8×8 matching blocks are labeled as $A_0$, $A_1$, $A_2$ and $A_3$, respectively in the 16×16 matching block 200. A search area memory module 212 is divided into four memory banks 214 to 220 to provide data concurrently to the PE arrays 204 to 210 which operate in parallel. For efficient memory accesses, a MUX network 222 is inserted between the search area memory module 212 and the PE arrays 204 to 210$m$ which distributes data to proper PE arrays. A current block memory 224 for storing the pixel data of a 16×16 current frame provides the current data to the PE array 202 through a bus 226.

Figure 6:
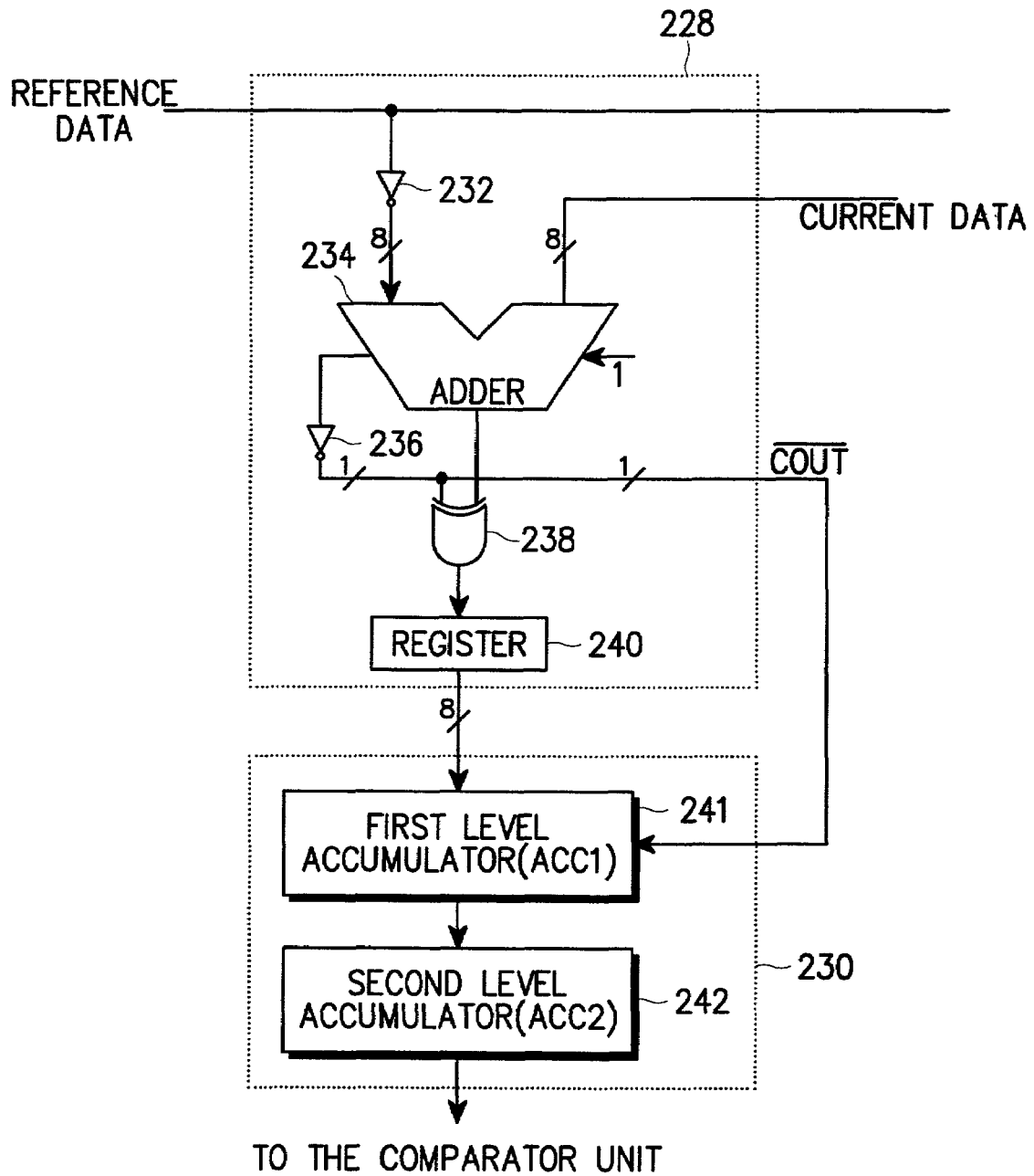
FIG. 6 is a block diagram of a PE according to the embodiment of the present invention.

FIG. 6 illustrates the structure of a PE according to the embodiment of the present invention. The PE is divided into a difference unit (D-unit) 228 and an accumulation unit (A-unit) 230 according to a stable delay time and efficient utilization of hardware resources in operation data paths. The D-unit 228 includes inverters 232 and 236, an adder 234, an exclusive-OR gate 238, and a register 240. The inverter 232 inverts reference data representing the pixels of a reference frame. The adder 234 adds current data representing the pixels of the current frame to the inverted reference data. The inverter 236 inverts a carry-out bit generated during the addition in the adder 234 and feeds the inverted carry-out bit $\overline{cout}$ to the A-unit 230. The exclusive-OR gate 238 exclusive-OR gates the outputs of the adder 234 and the inverter 236. The register 240 stores the output of the exclusive-OR gate 238. The A-unit 230 is composed of a first level accumulator (ACC1) 241 and a second level accumulator (ACC2) 242 for accumulating the output of the D-unit 228 at two levels. In the present invention, the output of only one D-unit 228 is not accumulated but a plurality of absolute values generated from D-unit arrays are accumulated together.

Figure 7:
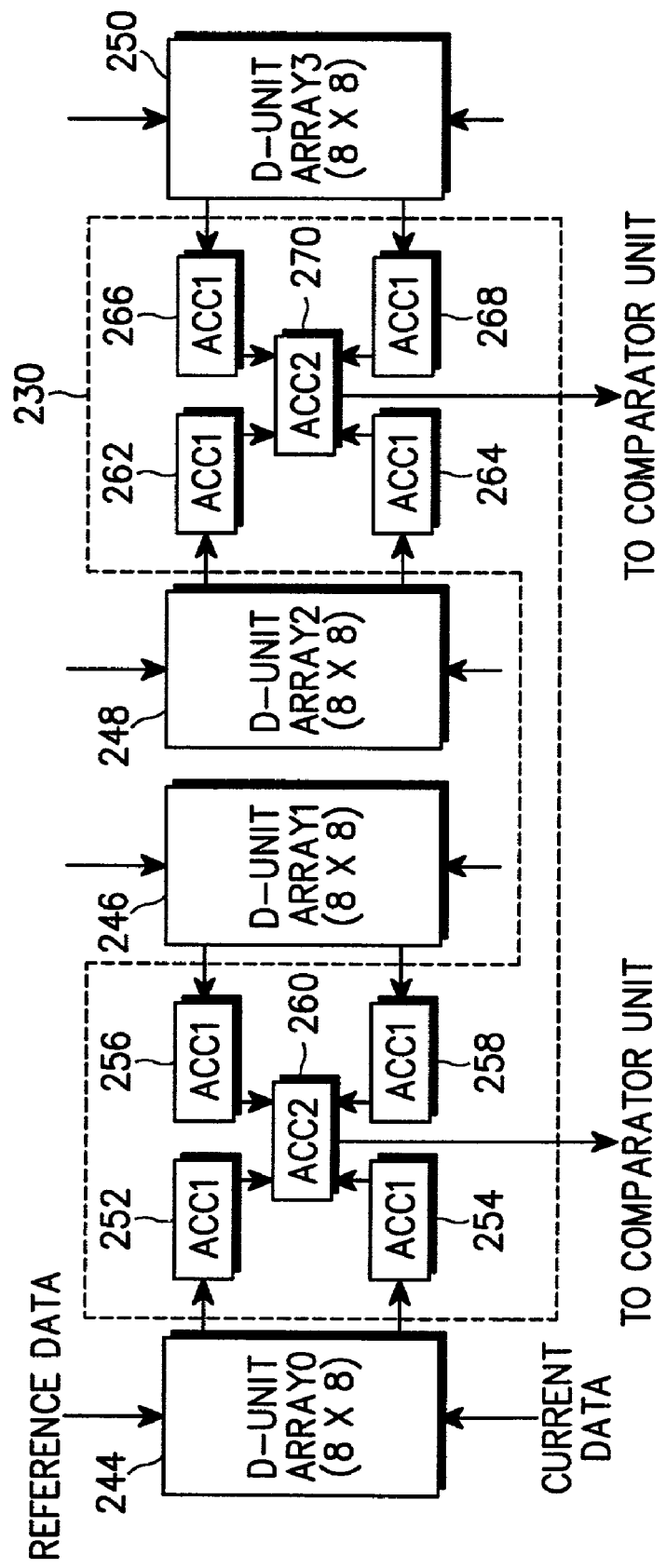
FIG. 7 is a block diagram of a block matching processor according to the embodiment of the present invention.

FIG. 7 is a block diagram of a block matching processor for a 16×16 macroblock in relation with the above-described PE according to the embodiment of the present invention. Referring to FIG. 7, each of four D-unit arrays 0–3 (244 to 250) corresponds to an array of 8×8 D-units 228 shown in FIG. 6. The four D-unit arrays 0–3 (244 to 250) correspond to the PE arrays 0–3 (204 to 210). Therefore, the D-unit arrays 244 to 250 include D-units which are arranged corresponding to the pixels of 8×8 matching blocks, calculate the differences between the pixels of the current frame and the pixels of the reference frame, and convert the differences to absolute values. An accumulator 230 connected to the D-unit arrays 244 to 250 is composed of ACC1s 252 to 258 and 262 to 268 and on pair of ACC2s 260 and 270. The ACC1s 252 and 254 accumulate absolute values generated from the D-unit array 0 (244), the ACC1s 256 and 258 accumulate absolute values generated from the D-unit array 1 (246), the ACC1s 262 and 264 accumulate absolute values generated from the D-unit array 2 (248), and the ACC1s 266 and 268 accumulate absolute values generated from the D-unit array 3 (250). Each of the ACC1s 252 to 258 and 262 to 268 adds the absolute values of a corresponding 8×4 sub-block divided from the 8×8 matching block and generates an SAD for the sub-block. The ACC2 260 generates an SAD for one 8×8 matching block by adding the SADs of two sub-blocks generated from the ACC1s 252 and 254, generates an SAD for the other 8×8 matching block by adding the SADs of the other two sub-blocks generated from the ACC1s 256 and 258, and generates an SAD for one 16×8 matching block by adding the SADs of the 8×8 matching blocks. In the same manner, the ACC2 270 generates an SAD for one 8×8 matching block by adding the SADs of two sub-blocks generated from the ACC1s 262 and 264, generates an SAD for the other 8×8 matching block by adding the SADs of the other two sub-blocks generated from the ACC1s 266 and 268, and generates an SAD for one 16×8 matching block by adding the SADs of the 8×8 matching blocks.

Figure 1:
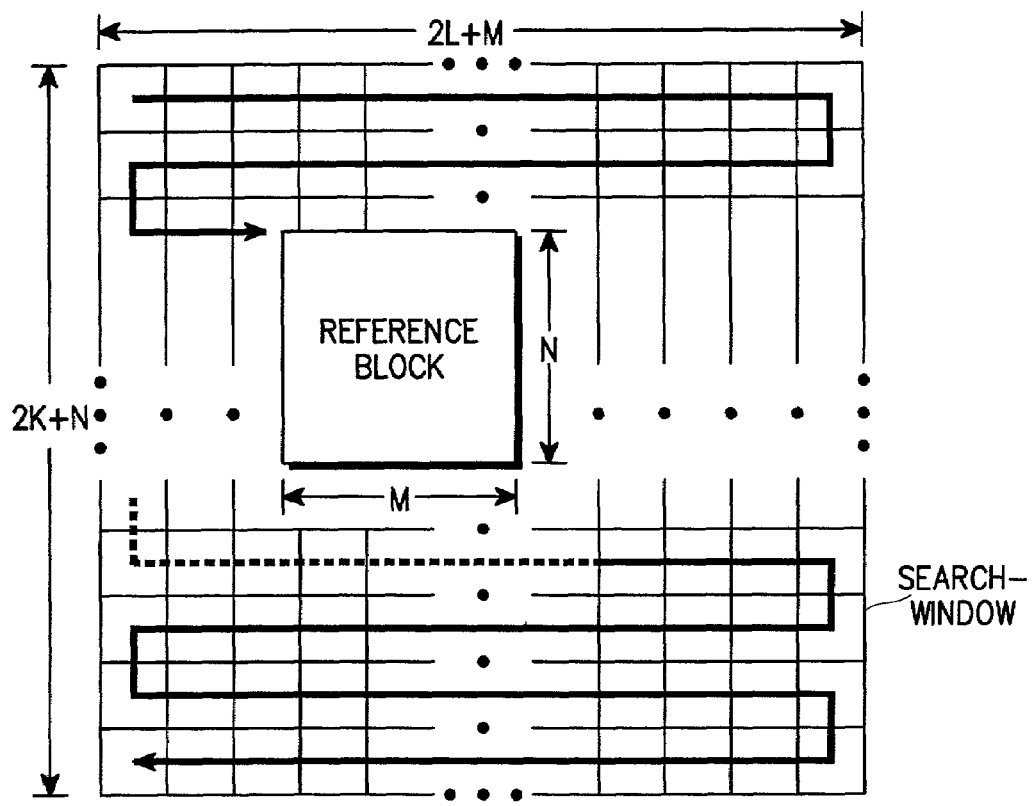
FIG. 1 illustrates a block matching computation flow in a conventional systolic array architecture.
Figure 2:
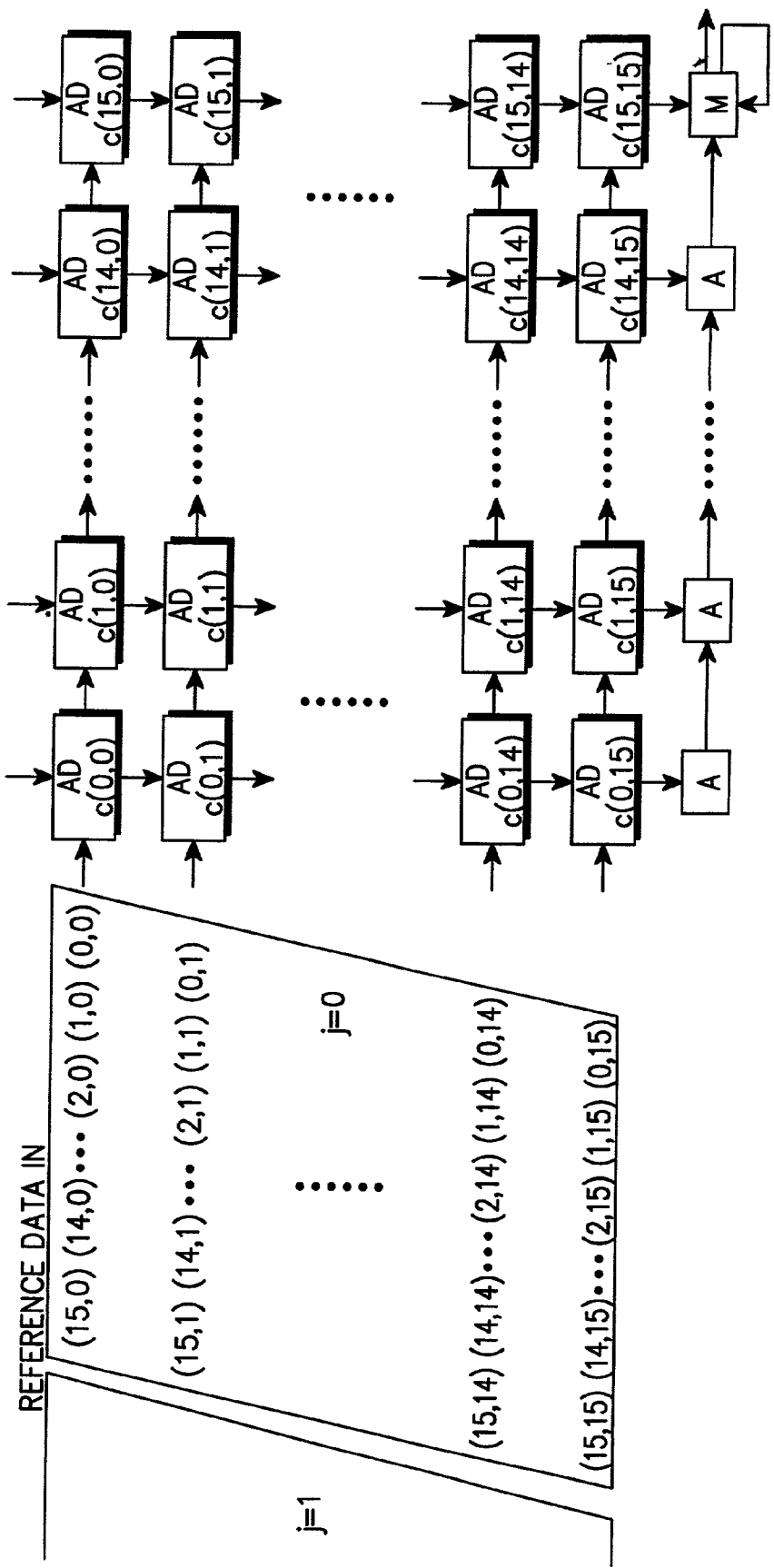
FIG. 2 illustrates a conventional two-dimensional systolic array for block matching.
Figure 3A:
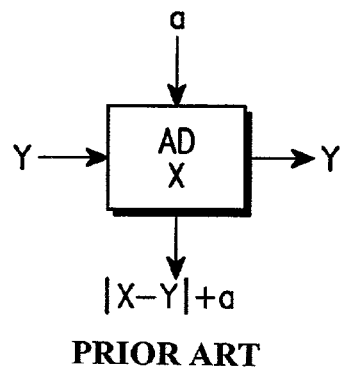
FIGS. 3A to 3D illustrate the elements shown in FIG. 2.
Figure 3B:
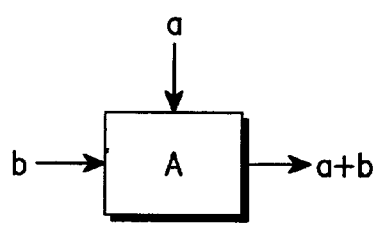
Figure 3C:
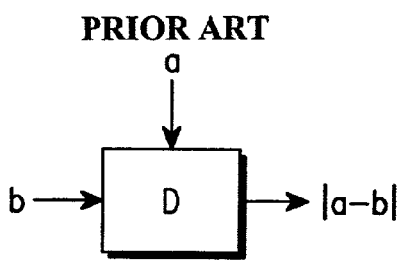
Figure 3D:
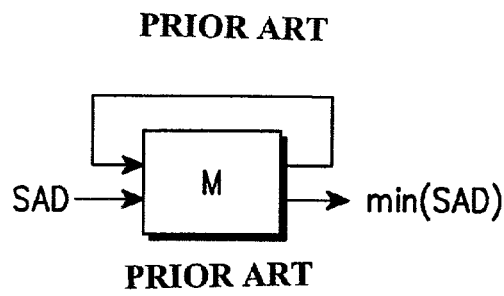

The architecture of the present invention is flexible in the sense that it is capable of managing various sizes of matching blocks and search ranges. For the variable search ranges, the flexibility and scalability can be attained by employing internal buffers and a proper data distribution network with a cascadable PE array configuration. In this case, the structure of an individual PE is not affected inherently. However, it becomes a different story when the size of a matching block changes. Because the maximum value of the SAD depends on the block size, the bit-width of a storage element for the SAD changes according to the size of the block. Moreover, the PE arrays need to be rearranged for the same account. To resolve this problem, the summation process needs to be separated from the pixel difference computation process in the SAD calculations. For additional motivations which follow, a single PE is divided into a D-unit and an A-unit. By dividing the PE into A- and D-units, SAD for the block of various sizes can be obtained easily from the intermediate nodes of an accumulation tree that form an ACC2 as later described. The intermediate result of an error accumulation increases as the matching process goes to the next PE in the systolic array (see FIG. 2). Hence, the bit-width of a storage element also needs to be increased and the regularity of all the PEs in the array can be broken. To maintain the regularity of all PEs, the bit-width of an accumulator should be fixed to the maximum value of the SAD, or error accumulators should be separated. Since the former approach wastes storage elements, the latter approach is preferable. Cycle time can be shortened by arranging the computational load. The D-unit calculates only differences and the A-unit does summations. Thus speedup can be acquired at each storage by distributing the three operations (subtraction, absolute value conversion, and accumulation) for block matching operation. Additionally, critical path and timing slack caused by unbalanced delay time among different computation steps can be actually removed by dividing the computation load.

Meanwhile, the operations performed in the D-unit 228 shown in FIG. 6 are subtraction and absolute value conversion. A ripple-carry adder (RCA) is employed for the subtraction of two 8-bit positive pixel values. The delay time of an RCA grows in proportion to the bit-width of input operands, and thus the overall delay in an 8-bit ripple-carry subtractor can be written as $8\Delta_{FA}$ (where $\Delta_{FA}$ denotes 1-bit full-adder delay). In the following to compare the speed with that of a different type of adder, a unit gate-delay is denoted as $\Delta_G$ (see I. Koren: 'Computer Arithmetic Algorithms' (John Wiley & Sons Inc. 1993) 1st edn. [reference 14], K. Hwang: 'Computer arithmetic, Principles, Architecture and Design' (John Wiley & Sons Inc., New York, 1979) 1st edn. [reference 15], and N. H. E. Weste and K. Eshraghian, 'Principles of CMOS VLSI Design' (Addison-Wesley Publishing Company, 1993) 2nd edn. [reference 16]). A rough comparison in terms of gate counts and delays between an RCA and a first carry-lookahead adder (CLA) is listed in Table 1.

TABLE 1

| Adder type | Number of 2-input gates required | Total delay time in terms of $\Delta_G$ |
|---|---|---|
| Ripple-carry adder | ≈7n | ≈2n$\Delta_G$ |
| Carry-lookahead adder | ≈13n (n = 4m, m = 1, 2, . . .) | ≈(n/2 + 3) $\Delta_G$ |

It is assumed that the CLA consists of four-bit unit groups with a separate carry-lookahead in each group. However, carry-lookahead logic over groups is not considered. For n=8, an RCA has about a half gate counts with half speed compared to a CLA. By employing an RCA, additional area advantage can be obtained, because it is more regular than a CLA. Furthermore, since the cycle time is not bounded by 8-bit pixel comparison, the area advantage of an RCA has more meaning than the speed advantage of a CLA.

Figure 4:
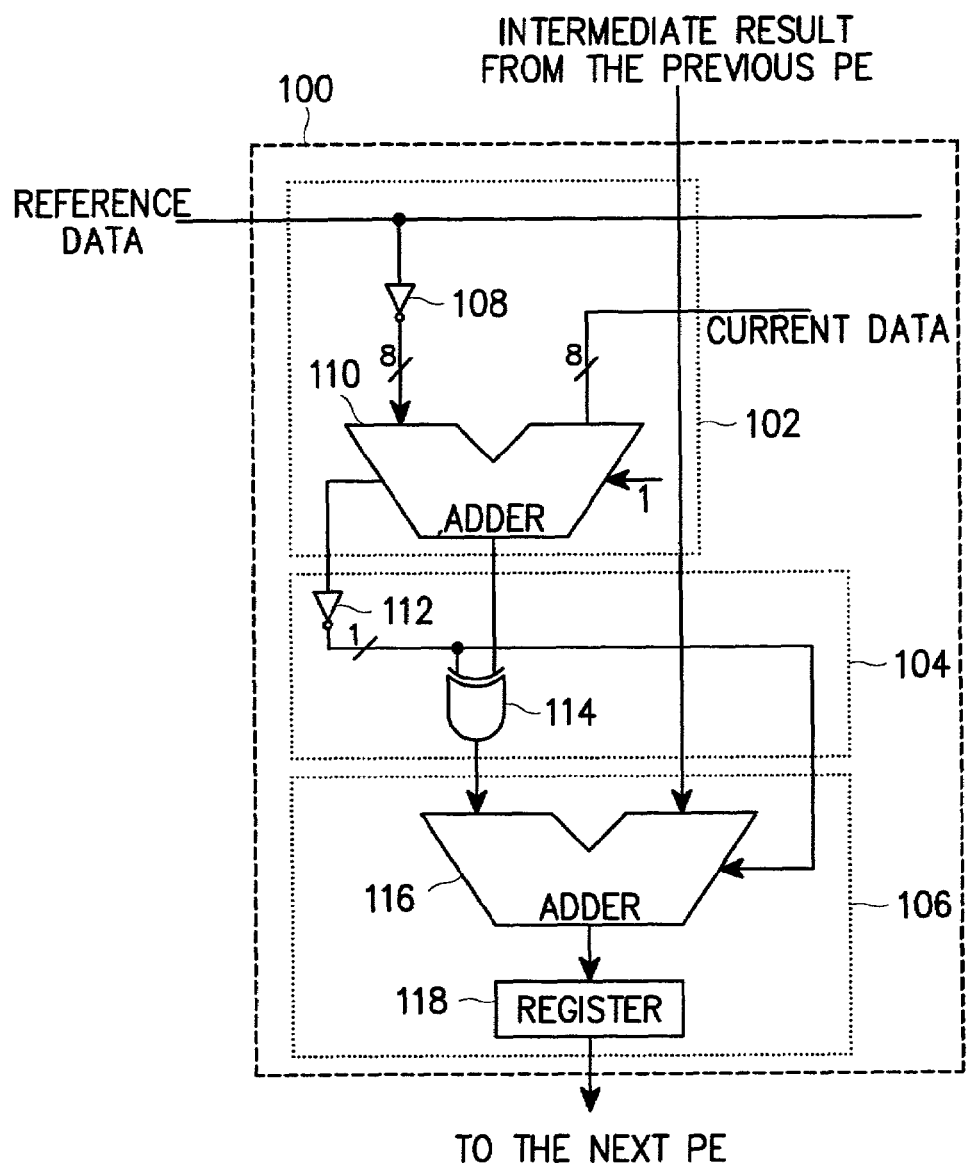
FIG. 4 is a block diagram of a conventional PE.

The absolute value conversion is just a 2's complement process for a negative number. A 2's complement conversion can be decomposed into two sub-processes: 1's complement (inversion of all bits) and an increment. Taking a 1's complement is a simple and fast operation of passing an inverter, whereas it takes an adder delay time to increment. In the conventional PE structure shown in FIG. 4, an incrementer is implemented within an accumulation stage by feeding the final carry-bit of the subtractor. Likewise, the D-unit 228 takes a 1's complement of the subtraction result and transmits the inverted final carry-bit, $\overline{cout}$ to the A-unit 230.

Now, the A-unit 230 will be described. To deal with the various sizes of matching blocks, the A-unit 230 is built in a hierarchical carry-save adder (CSA) tree. Since each of carry and sum is generated independently, the carry-save addition requires more bit-lines and a final merging adder. However, this area penalty is minor compared to the area gains obtained from the regularity and modularity of CSA trees. Furthermore, it takes constant delay time independent of the input operand bit-width because carry need not be propagated to generate the result.

Figure 8:
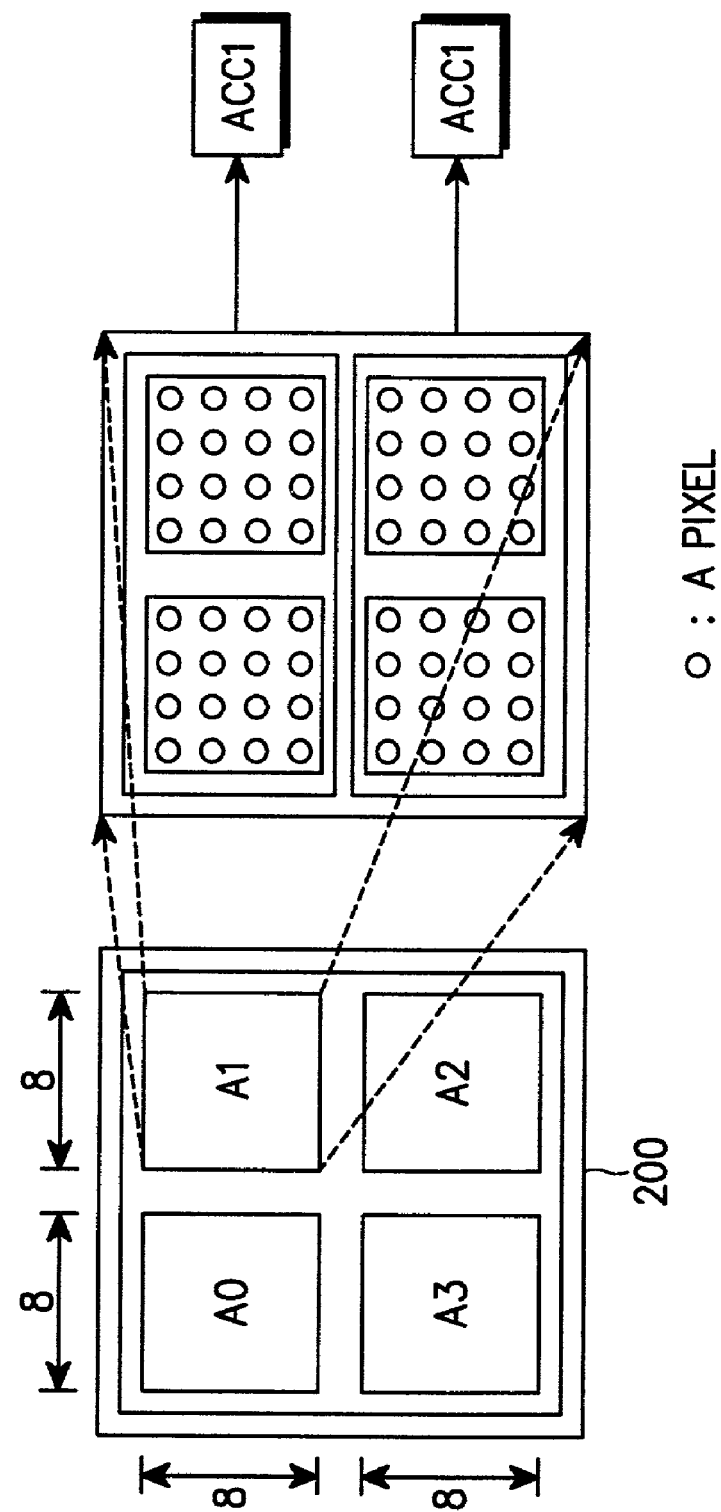
FIG. 8 illustrates a matching block organization and mapping to an A-unit according to the embodiment of the present invention.
Figure 9A:
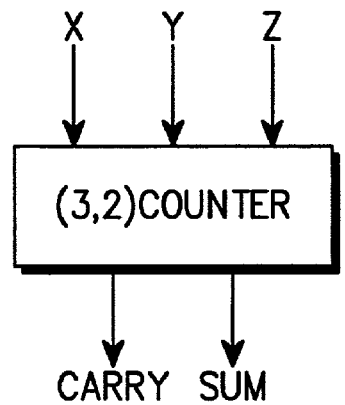
FIGS. 9A and 9B illustrate a (3, 2) counter and a (4, 2) counter, respectively.
Figure 9B:
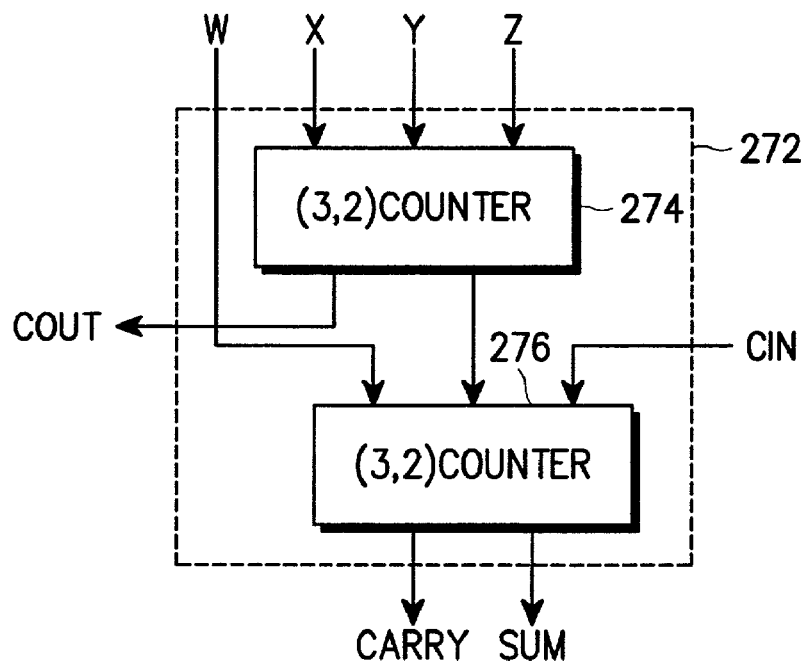

As shown in FIG. 8, a total of 64 pixels in the 8×8 matching block is divided into two parts and each of them is processed in parallel by the ACC1. The ACC1 is constructed using carry-save (4, 2) counters. Although other sophiscated circuit designs of a (4, 2) counter are possible, a (4, 2) counter 272 made up of two (3, 2) counters 272 and 276 shown in FIG. 9B is considered as shown in FIG. 9A (see [reference 14]). In this case, the delay of the (4, 2) counter 272 can be regarded as about twice that of a (3, 2) counter. The advantages of a (4, 2) counter over a (3, 2) counter are higher modularity and regularity in constructing the adder tree, especially for the $2^n$ (n is a positive integer) number of input operands.

Figure 10:
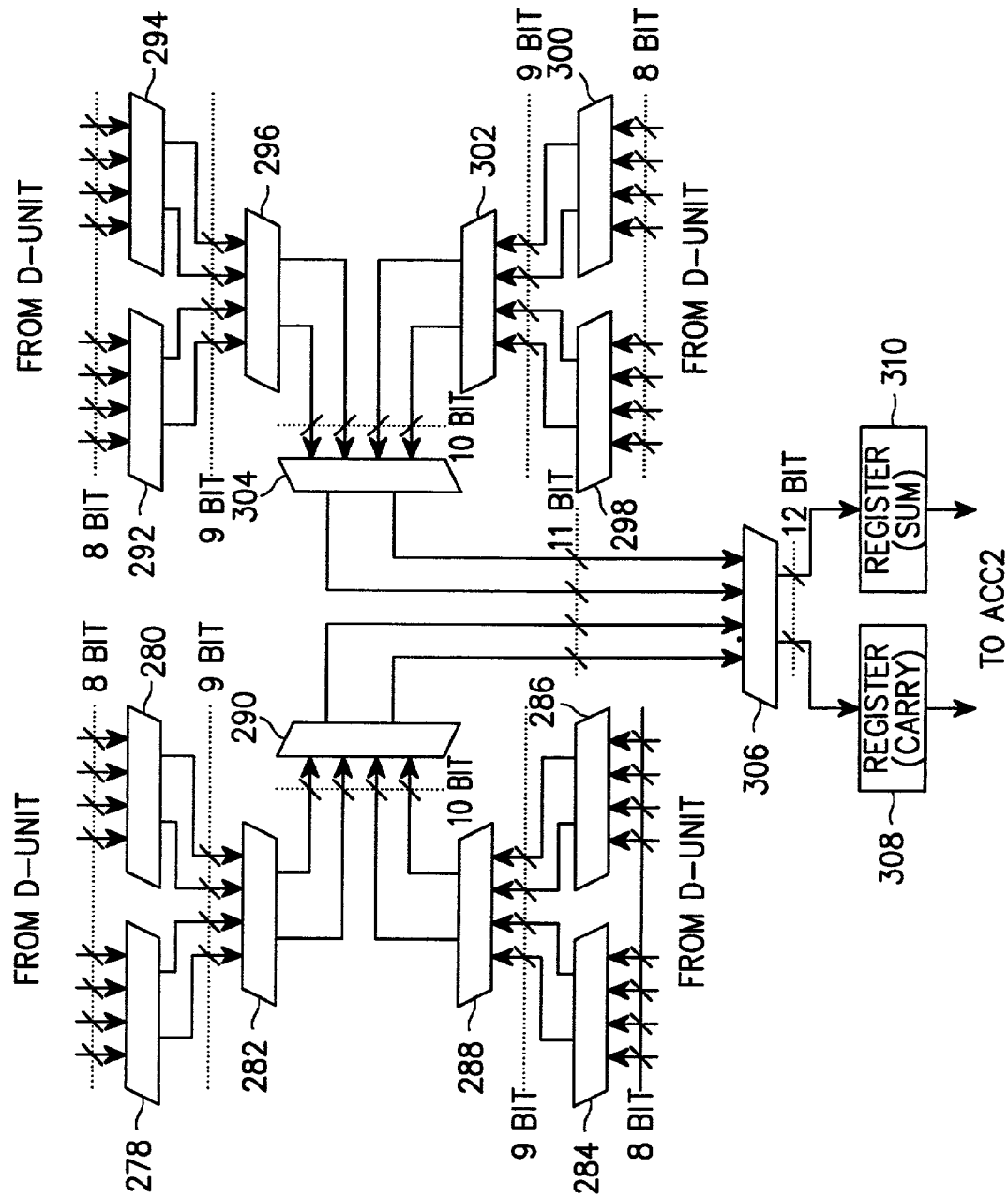
FIG. 10 illustrates the structure of a first level accumulator (ACC1) according to the embodiment of the present invention.

One ACC1 includes a total of 15 (4, 2) counters 278 to 306 and features a quad-tree-like configuration as shown in FIG. 10. A total of 32 pixel-difference results of the 8×4 sub-blocks from the D-unit arrays are accumulated though four levels of (4, 2) counters. The depth of the (4, 2) counter tree is determined considering the delay balance between the D-unit and the A-unit. Like in a (3, 2) counter, the delay time of a (4, 2) counter is independent of the input operand bit-width and can be expressed as $2\Delta_{FA}$. Accordingly the propagation delay of a four-level (4, 2) counter is $8\Delta_{FA}$ ($=4\times2\Delta_{FA}$), which is matched closely to the total delay time of the D-unit as intended. The data bit-width increases by one as the accumulation progresses to the next (4, 2) counter because the amount of error to be summed is doubled. Since the ACC1 includes carry-save (4, 2) counters, two registers 308 and 310 should be reserved for both sum and carry.

Figure 11:
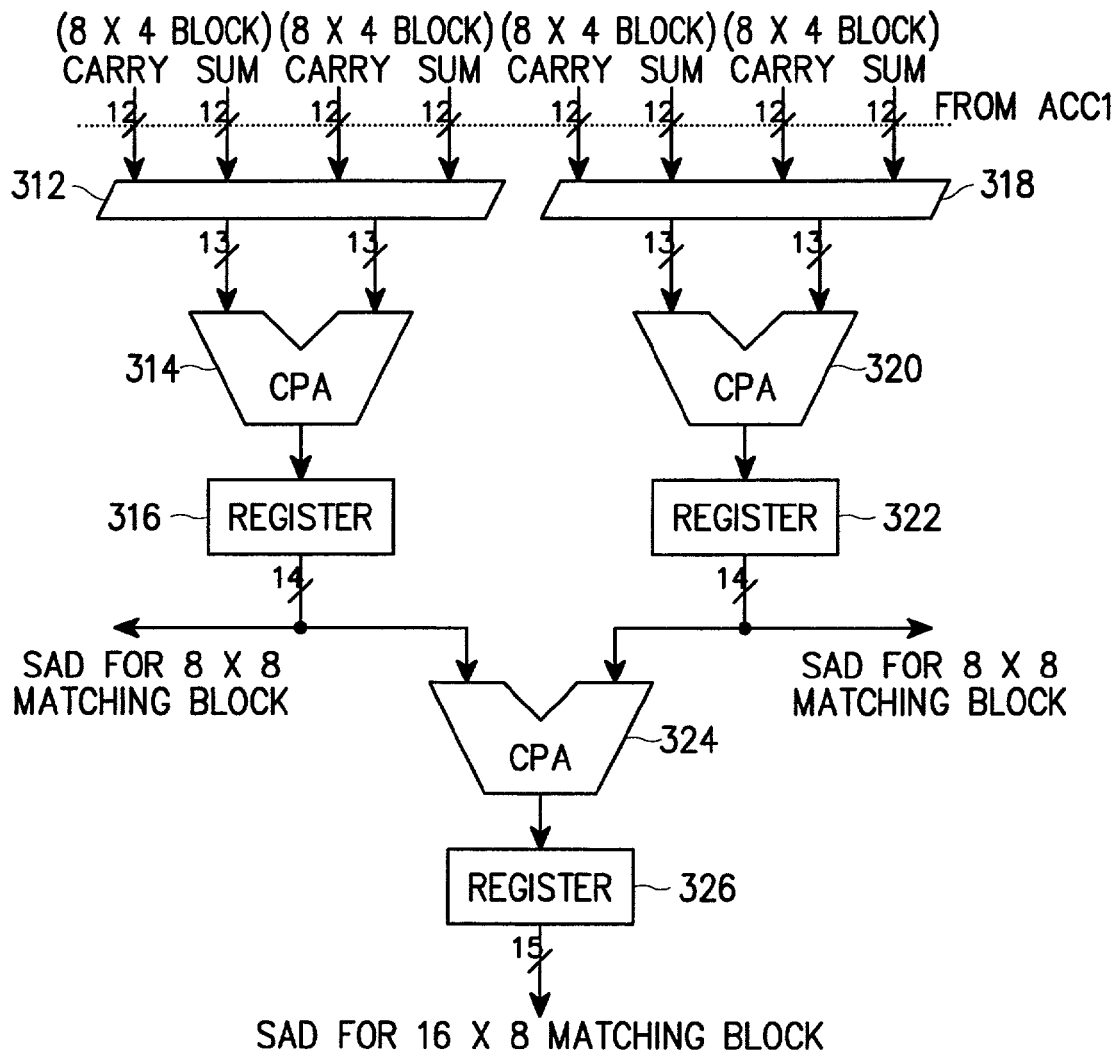
FIG. 11 illustrates the structure of a second level accumulator (ACC1) according to the embodiment of the present invention.

As shown in FIG. 11, two stages of the A-unit constitute an ACC2 which forms a binary-tree structure. In the first stage of addition, four inputs from two ACC1s are added to produce the SAD for an 8×8 size matching block. This process is accomplished by generating the SAD for an 8×8 matching block with two (4, 2) counters 312 and 318 and two carry-propagate adders (CPAs) 314 and 320 and storing the SAD in registers 316 and 322. The second stage of the ACC2 receives the intermediate results from the first stage and produces the SAD for a 16×8 matching block with a single CPA 324. Therefore, the ACC2 generates an SAD for one 8×8 matching block by adding the SADs for two sub-blocks generated from a couple of ACC1s, generates an SAD for the other 8×8 matching block by adding the SADs for the other two sub-blocks generated from another couple of ACC1s, and generates an SAD for a 16×8 matching block by adding the SADs of the 8×8 matching blocks. Because SAD for the block of various sizes such as those of an 8×8 matching block and a 16×8 matching block can be obtained easily from the intermediate nodes of the accumulation tree, the various sizes of matching blocks and search ranges can be supported with a single hardware. For a highly pipelined operation, the delay in the ACC@ is also designed to be matched to that of the D-unit and the ACC1. During synthesizing each logic block, special attention is paid to the delay matching among different computation units through intensive timing simulation.

As described above, the (4, 2) counter array that form a quad-tree-like configuration primarily accumulates the SADs for sub-blocks and the ACC2 sums the intermediate results, to thereby obtain the SAD for a larger block.

As mentioned in the D-unit description, the result of the subtraction will be 1's complemented if it is negative and then transmitted to the A-unit with an inverted final carry-put bit, i.e. $\overline{cout}$. The $\overline{cout}$ is to be used as the carry-in of the accumulation adder to complete the 2's complement process as shown in FIG. 6. In the A-unit architecture according to the present invention, all $\overline{cout}$ bits transmitted from the four D-units cannot be reflected because the (4, 2) counter 272 of FIG. 9B has only one carry-in bit for the four input operands. Appending an additional adder logic to exactly evaluate all $\overline{cout}$'s might break the structural regularity and the modularity of an accumulator tree. The problem is resolved considering the trade-off between the accuracy and the hardware cost.

Figure 12:
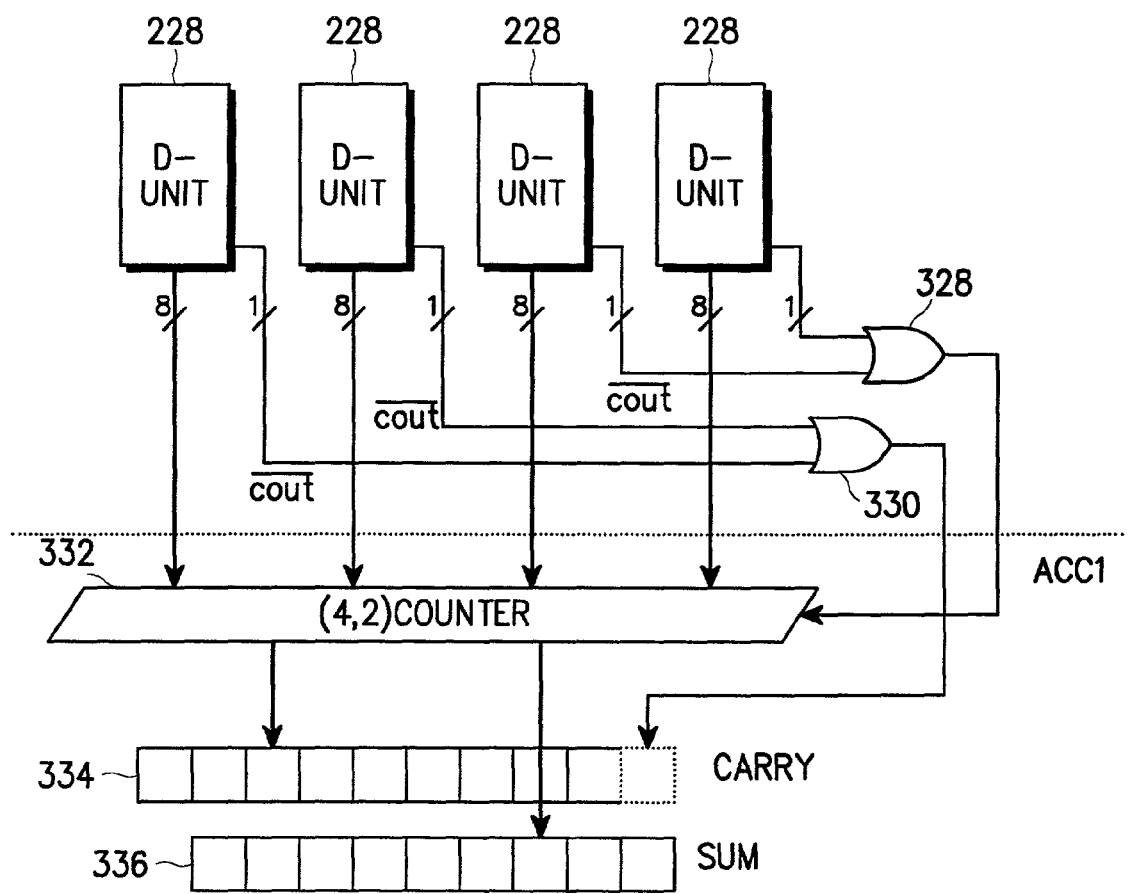
FIG. 12 illustrates carry bit mapping to the A-unit.

As shown in FIG. 12, the four $\overline{cout}$ bits from the four D-units 228 are compressed into two bits by OR-ing in pairs and then transmitted to the A-unit. One goes to the carry-in of a (4, 2) counter 332 of FIG. 12 and the other to the LSB position of the carry result of the (4, 2) counter 332. The carry and sum generated from the (4, 2) counter 332 are stored in registers 334 and 336, respectively. Accuracy loss occurs only when the two $\overline{cout}$'s to be OR-ed by OR-gates 328 and 330 are all 1s, that is, two pixel-difference values are all negative. The probability of the pixel-difference value being negative is 0.5 because it is random and the distribution function can be assumed uniform. Consequently, the probability of losing the accuracy is 0.25 (=0.5×0.5) and the expectation value of the accuracy loss per pixel comparison is 0.125 (=0.25×½) in the embodiment of the present invention.

Figure 13A:
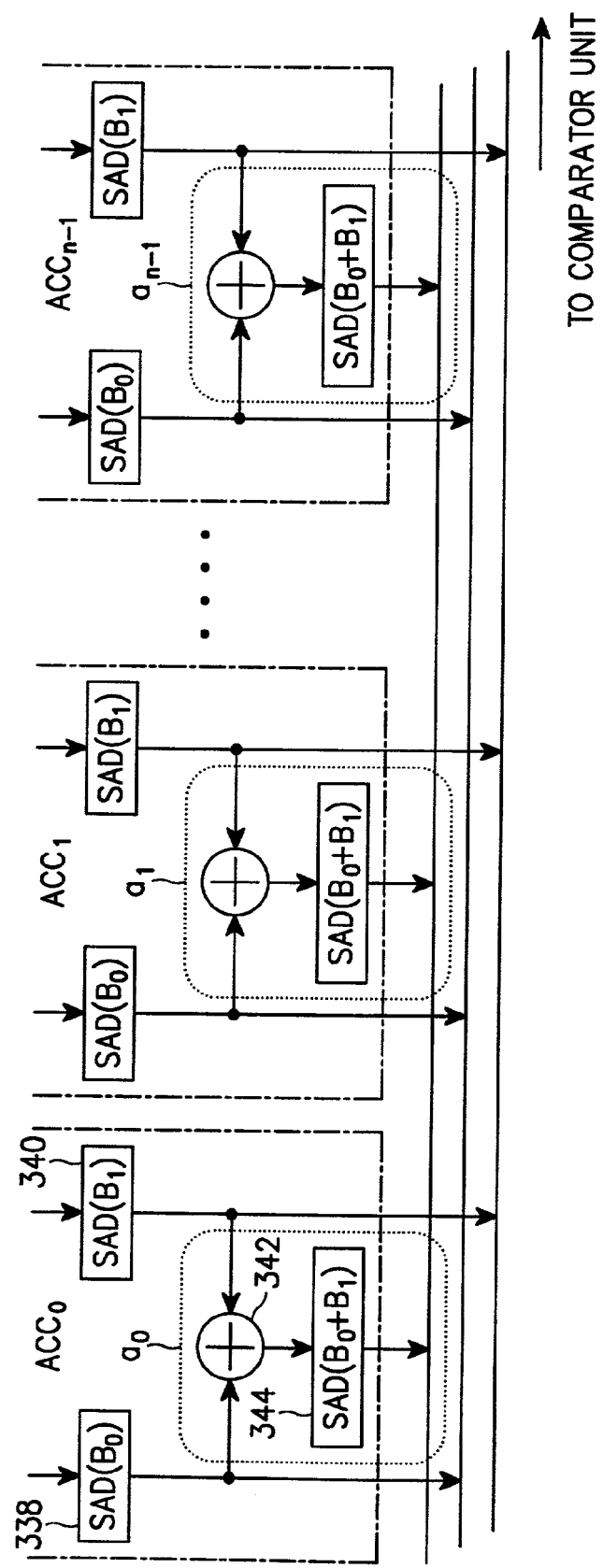
FIG. 13A illustrates additional storages for various sizes of blocks.
Figure 13B:
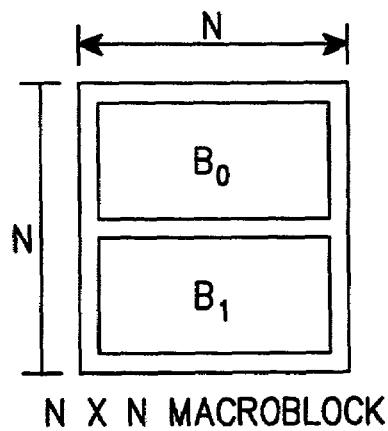
FIG. 13B illustrates an N×N block composed of sub-blocks $B_0$ and $B_1$.
Figure 13C:
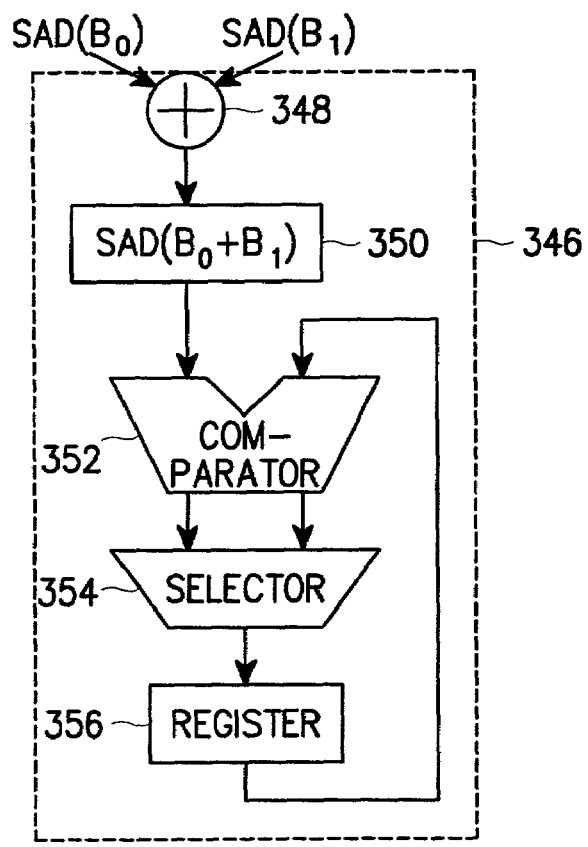
FIG. 13C illustrates the structure of an ACS-like comparator unit according to embodiment of the present invention.

The final step in block matching motion estimation is the comparison of the SADs to find the minimum one. To generate an SAD for a large size matching block, the SADs of small size matching blocks must be added up and stored in $ACC_0$ to $ACC_{n-1}$ with adders 342 and registers 344 in FIG. 13. If these processes are attributed to a comparator unit, the A-unit need not produce and store the SADs for matching blocks of different sizes. Fortunately, the SAD comparison is carried out in a block-by-block fashion and thus need not be paralleled massively such as block matching operations. Considering all these observations, a merged add-compare-select (ACS) logic. For an N×N matching lock composed of two sub-blocks as shown in FIG. 13B, the $ACC_0$ to $ACC_{n-1}$ of FIG. 13A can be merged to a single logic block by employing a comparator 346 shown in FIG. 13C. Therefore, only the SADs for the sub-blocks $B_0$ and $B_1$ are produced in each A-unit and then sent to the comparator unit 346. In the comparator unit 346, an adder 348 adds $SAD(B_0)$ to $SAD(B_1)$ and a register 350 stores $SAD(B_0)+SAD(B_1)$. A comparator 352 compares the $SAD(B_0)+SAD(B_1)$ with the previous SAD stored in a register 356 and a selector 354 selects the smaller of the SADs. The selected SAD is stored in the register 356. By using the comparator unit 346, arithmetic- and storage-elements for the SADs of various matching blocks are much reduced.

Figure 13D:
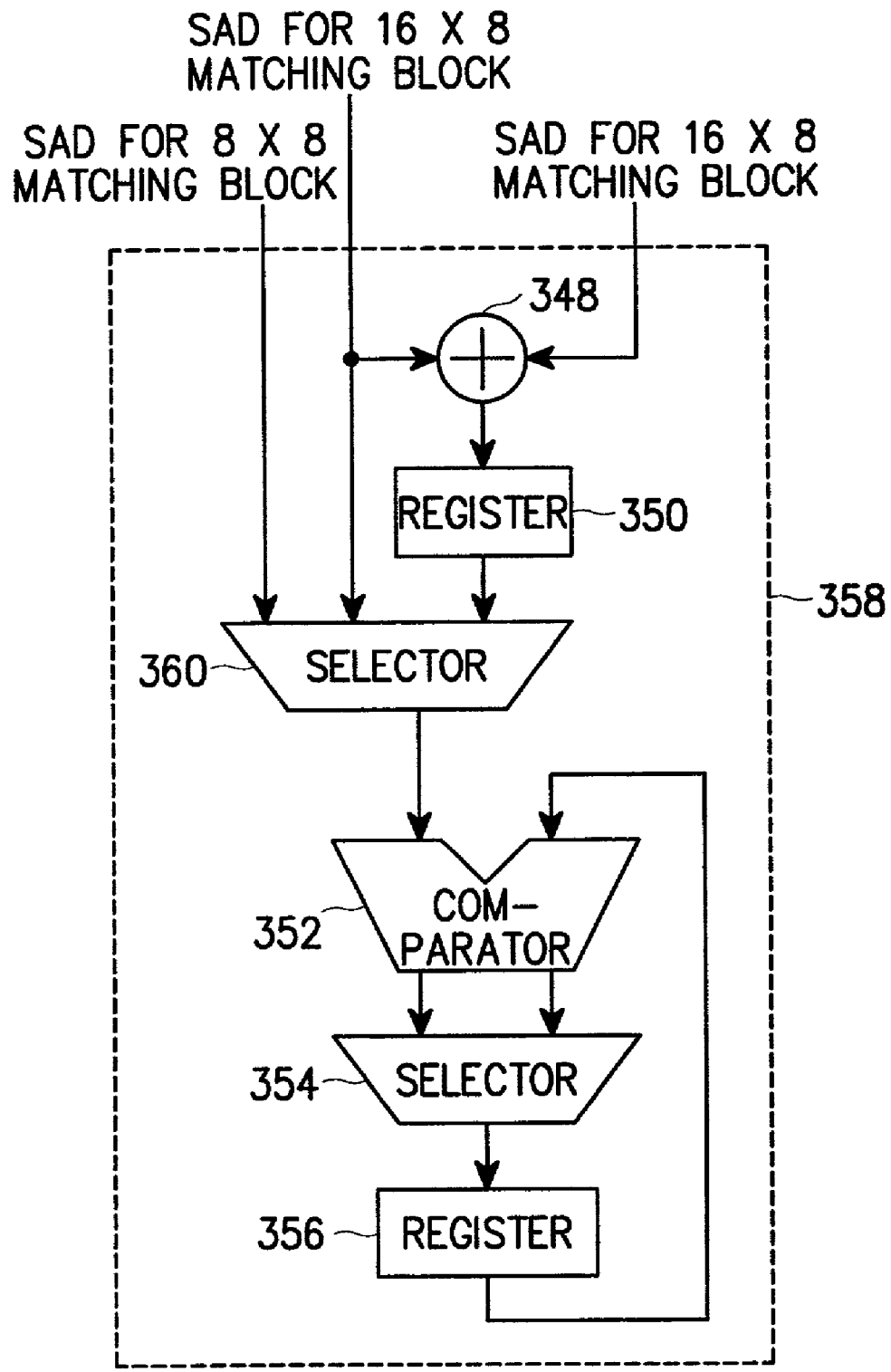
FIG. 13D illustrates the structure of a comparator unit according to the embodiment of the present invention.

FIG. 13D illustrates a comparator unit 358 constructed by adding a selector 360 to the above-described comparator unit 346 according to the embodiment of the present invention. The selector 360 selects one of SADs for 8×8 matching blocks and an SAD for a 16×8 matching block received from an ACC2, and an SAD for an 16×16 matching block added in an adder 348 and then stored in a register 350 according to a motion vector prediction mode and feeds the selected SAD to the comparator 352. The comparator 352 compares the input SAD with the previous SAD and selects the smaller of the two.

Figure 14A:
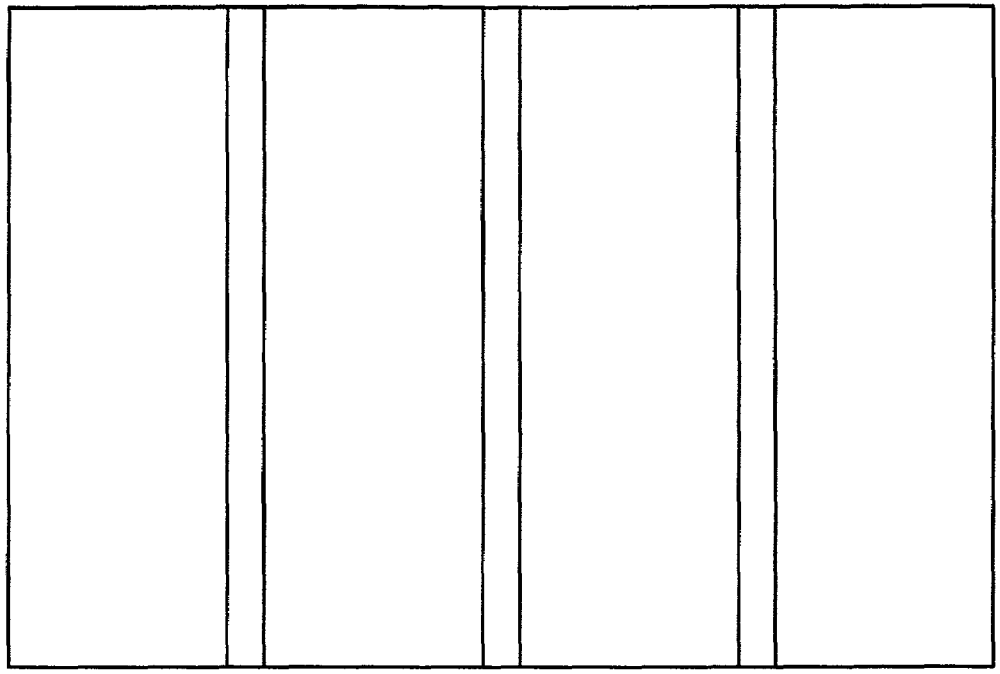
FIGS. 14A and 14B illustrate standard cell implementation of 128 PE's arrays in the conventional architecture versus the architecture according to the embodiment of the present invention in the aspects of layout and size.
Figure 14B:
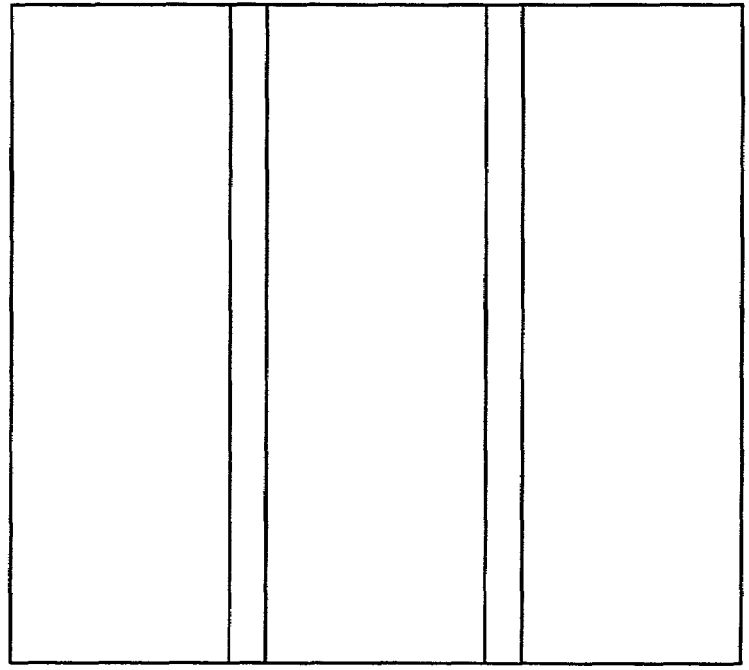

The arrays of 128 PEs of the conventional architecture and the architecture of the present invention are implemented for evaluation. Assuming that each of 16 current- and reference-block data can be loaded in parallel, two-dimensional 16×8 PE arrays are constructed. First, the array architectures are designed using the Verilog hardware description language and then register-transfer-level (RTL) simulations are performed for functional verification. Gate-level synthesis, simulation and backend works such as placement, route ad post-layout simulation are all carried out using the COMPASS Design Navigator CAD tool with LG 5V 0.6 μm 3-metal layer CMOS technology (see LG Semicon: '0.6 μm 5-Volt High Performance Library—gvsc650/3', LG Semicon Co., Ltd., 1995 [reference 17]). Although a full-custom design style can best exploit the regularity and the area efficiency of an array processor, it requires considerable design efforts. Thus for fast prototyping and architecture evaluation, standard cell implementation is employed. FIGS. 14A and 14B illustrate the realized standard cell layouts of chips according to the conventional architecture and the architecture of the present invention for comparison in terms of structure and size. The partitioning of the standard cell blocks follows the guidance rule of the implementation technology according to the target operating frequency. The normal operating clock frequency is selected as 54 MHz which is common in typical MPEG-2 video encoders.

To completely check the function and timing of the realized VLSI architecture, the post-layout simulations have been run in all the best, typical and worst case conditions as listed in Table 2. After passing all the tests, the longest operational path delay is obtained in the worst case simulation.

TABLE 2

| | Simulation condition | | |
|---|---|---|---|
| | Best case | Typical case | Worst case |
| Ambient temperature | 0° C. | 25° C. | 70° C. |
| Voltage | 5.5 V | 5 V | 4.5 V |
| Process | best | typical | worst |

Table 3 summarizes the architecture evaluation results in terms of area and speed (the longest operational path delay). Due to careful delay matching efforts in the PE design and efficient error accumulation network employing carry-save (4, 2) counter, the PE array of the present invention has 34% less area with 42% speed-up compared to the conventional one.

TABLE 3

| | Conventional PE array | Proposed PE array |
|---|---|---|
| Array configuration | 16 × 8 | 16 × 8 |
| Transistor counts | 302856 | 214021 |
| Area | 240.9 × 158.6 mm$^2$ (38209 mm$^2$) | 184.8 × 136.1 mm$^2$ (25157 mm$^2$) |
| The longest operational path delay (post-layout) | 14.22 ns | 10.08 ns |

As described above, the novel block matching architecture in 0.6 μm CMSO technology is implemented and the functional correctness and timing are verified through intensive simulation along at the entire deign levels. VLSI realization shows the efficiency improvement of the architecture of the present invention in both area and speed.

Without additional hardware and control overhead, the architecture of the present invention accommodates matching blocks of various sizes and the miscellaneous motion vector prediction modes of current video coding standards. By decomposing the PE into the D-unit and the two-level A-unit, very high efficiency is achieved in area and speed. The ACS style comparator unit is also devised to achieve further area efficiency.

While the invention has been shown and described with reference to a certain preferred embodiment thereof, it is a mere exemplary application. While 8×8, 16×8 and 16×16 matching block sizes are used in the embodiment of the present invention, the present invention is also applicable to more matching block sizes as far as matching blocks used in motion vector estimation modes are of sizes being a multiple of that of the smallest matching block. Furthermore, the adder 348 of the comparator unit can be incorporated into the ACC2. Finally, a person of ordinary skill in the art understands that equivalent circuit logic may be used which is within the spirit of the invention and scope of the appended claims, and the invention is not limited to the hardware shown in the drawings. Therefore, it will be understood by those skilled in the art that various changes in form and details may be made therein without departing from the spirit and scope of the invention as defined by the appended claims.

What is claimed is:

1. A block matching processor for flexibly supporting block matching motion estimation at motion vector prediction modes for a plurality of matching blocks of pixels having non-uniform sizes that are multiples of a smallest matching block of said plurality of matching blocks, said processor comprising: a plurality of difference unit (D-unit) arrays configured for respectively generating an absolute value of a respective smallest size matching block, each of the plural D-unit array comprising a plurality of D-units that are arranged to correspond with an arrangement of pixels of a respective smallest size matching block, each D-unit array being configured for calculating the pixel-to-pixel differences between the pixels of a current frame and the corresponding pixels of a reference frame and for converting the differences to absolute values; and at least one accumulator unit (A-unit) including a plurality of accumulators, said accumulator unit being connected to the D-unit arrays for generating an SAD (Sum of Absolute Difference) for each smallest size matching block, and an SAD for all of the plurality of matching blocks of pixels having non-uniform sizes by hierarchical addition of the absolute values of the smallest size matching blocks received from the D-unit arrays.

2. The block matching processor according to claim 1, wherein the accumulator comprises a two-stage unit forming a binary-tree structure for hierarchical addition.

3. The block matching processor of claim 1, further comprising a comparator unit connected to the accumulator for selecting one of the SADs of the matching blocks non-uniform sizes of according to a motion vector prediction mode, for comparing the selected SAD with the previous stored SAD, for selecting a smaller SAD of the two, and for storing the smaller SAD.

4. The block matching processor according to claim 1, wherein the smallest size of said matching blocks having non-uniform sizes is 4.times.4.

5. The block matching processor according to claim 1, wherein the smallest size of said matching blocks having non-uniform sizes is non-symmetrical.

6. The block matching processor according to claim 5, wherein the smallest size of said matching blocks having non-uniform sizes is 4.times.8.

7. A block matching processor for flexibly supporting block matching motion estimation at motion vector prediction modes, where a size of matching blocks used is one of 8.times.8, 16.times.8 and 16.times.16 pixel sizes, comprising: a plurality of difference unit (D-unit) arrays for generating absolute values of each 8.times.8 matching block, each D-unit array having D-units arranged corresponding to the pixels of said each 8.times.8 matching block for calculating the difference between the pixels of a current frame and the pixels of a reference frame, and converting the differences to absolute values; and at least one accumulator unit (A-unit) including a plurality of accunmlators, said accumulator Liflit being connected to the D-unit arrays, for generating an SAD (Sum of Absolute Difference) for said each 8.times.8 matching block, and an SAD for a 16.times.8 matching block by hierarchical addition of the absolute values of the 8.times.8 matching blocks generated by and received from the plurality of D-unit arrays.

8. The block matching processor according to claim 7, wherein the accumulator comprises a two-stage unit forming a binary-tree structure for hierarchical addition.

9. The block matching processor of claim 7, wherein the accumulator comprises: a pair of first level accumulators connected to each D-unit array, each first level accumulator generating a SAD for one of two 8.times.4 sub-blocks separated from an 8.times.8 matching block by adding absolute values of the sub-block based on the absolute values of the 8.times.8 matching block received from a D-unit array connected to the first level accumulator; and a pair of second level accumulators, each second level accumulator connected to two pairs of first level accumulators, for generating a SAD for the 8.times.8 matching block by adding the SADs of two sub-blocks received from the connected first level accumulators and generating a SAD for a 16.times.8 matching block by adding the SADs of the 8.times.8 matching blocks.

10. The block matching processor of claim 9, wherein each D-unit calculates the difference between pixels of said current frame and pixels of said reference frame using a ripple-carry adder (RCA).

11. The block matching processor of claim 9, wherein each first level accumulator is of a hierarchical carry-save adder (CSA) binary-tree structure with carry-save (4, 2) counters connected in a quad-binary-tree configuration.

12. The block matching processor of claim 10, wherein each first level accumulator is of a hierarchical carry-save adder (CSA) binary-tree structure with carry-save (4, 2) counters connected in a quad-binary-tree configuration.

13. The block matching processor of claim 11, wherein each second level accumulator is a binary-tree structure comprising two carry-save (4, 2) counters and two carry-propagate adder (CPA) for generating the SAD of an 8.times.8 matching block by adding the SADs of two sub-blocks and a third CPA for generating the SAD of a 16.times.8 matching block by adding the SADs of two 8.times.8 matching blocks.

14. The block matching processor of claim 12, wherein each second level accumulator is a binary-tree structure comprising two carry-save (4, 2) counters and two carry-propagate adder (CPA) for generating the SAD of an 8.times.8 matching block by adding the SADs of two sub-blocks and a third CPA for generating the SAD of a 16.times.8 matching block by adding the SADs of two 8.times.8 matching blocks.

15. The block matching processor of claim 7, further comprising a comparator unit for generating a SAD of a 16.times.16 matching block by adding the SADs of two 16.times.8 matching blocks generated from the single pair of second level accumulators, selecting one of the SADs of the 8.times.8, 16.times.8, and 16.times.16 matching blocks according to a motion vector prediction mode, comparing the selected SAD with the previous stored SAD, selecting the smaller of the two, and storing the smaller SAD.

16. A method for flexibly supporting block matching motion estimation at motion vector prediction modes for a plurality of matching blocks of pixels having non-uniform sizes that are multiples of a smallest matching block of said plurality of matching blocks, comprising the steps of: (a) respectively generating an absolute value of a respective smallest size matching block in a corresponding D-unit array of a plurality of difference unit (D-unit) arrays, wherein each of the plural D-unit arrays comprises a plurality D-units that are arranged to correspond with an arrangement of pixels of said smallest size matching block; (b) calculating, by each D-unit, pixel-to-pixel differences between the pixels of a current frame and the associated pixels of a reference frame (c) converting the differences calculated in step (b) to absolute values; (d) generating an SAD (Sum of Absolute Difference) for each smallest size matching block, and (e) generating an SAD for all of the plurality of matching blocks of pixels having non-uniform sizes by hierarchically adding, by a plurality of accumulators disposed externally from, and connected to, the D-unit arrays, the absolute values of the smallest size matching blocks.

17. The method according to claim 16, wherein the hierarchical addition made by providing the accumulator with a binary-tree structure.

18. The method according to claim 16, further comprising: (f) selecting one of the SADs of the matching blocks non-uniform sizes of according to a motion vector prediction mode; and (g) comparing the selected SAD with a previously stored SAD to determine a smaller SAD of the two, and (h) storing the smaller SAD determined in step (g).

19. The method according to claim 16, wherein the smallest size of each matching block in step (a) is 4.times.4.

20. The method according to claim 16, wherein the smallest size of each matching block in step (a) is 4.times.8.

21. The method according to claim 16, wherein the smallest size of each matching block in step (a) is 8.times.8.

22. A method for flexibly supporting block matching motion estimation at motion vector prediction modes, where a size of matching blocks used is one of 8.times.8, 16.times.8 and 16.times.16 pixel sizes, said method comprising the steps of: (a) generating absolute values of each 8.times.8 matching block for each D-unit array of a plurality of difference unit (D-unit) arrays having D-units arranged corresponding to the pixels of said each 8.times.8 matching block; (b) calculating a difference between the pixels of a current frame and the pixels of a reference frame, (c) converting the differences calculated in step (b) to absolute values; (d) generating an SAD (Sum of Absolute Difference) for said each 8.times.8 matching block, and an SAD for a 16.times.8 matching block by hierarchically adding the absolute values of the 8.times.8 matching blocks generated in step (a) by the plurality of D-unit arrays, by means of a plurality of accumulators disposed externally from, and connected to, the D-unit arrays.

23. The method according to claim 22, the hierarchical adding is performed by an accumulator having a pair of first level accumulators and a pair of second level accumulators, said pair of first level accumulators being connected to each D-unit array, generating a SAD for one of two 8.times.4 sub-blocks separated from an 8.times.8 matching block by each first level accumulator adding absolute values of the sub-block based on the absolute values of the 8.times.8 matching block received from a D-unit array connected to the first level accumulators; and generating a SAD for the 8.times.8 matching block by adding the SADs of two sub-blocks received from the connected first level accumulators and generating a SAD for a 16.times.8 matching block by adding the SADs of the 8.times.8 matching blocks by said pair of second level accumulators.

24. The method according to claim 22 wherein the calculating in step (b) of the difference between pixels of said current frame and pixels of said reference frame is performed by using a ripple-carry adder (RCA).

25. The method according to claim 23, wherein each first level accumulator generating the SAD for one of the two 8.times.4 sub-blocks is of a hierarchical carry-save adder (CSA) binary-tree structure with carry-save (4, 2) counters connected in a quad-binary-tree configuration.

* * * * *